UNITED STATES PATENT OFFICE.

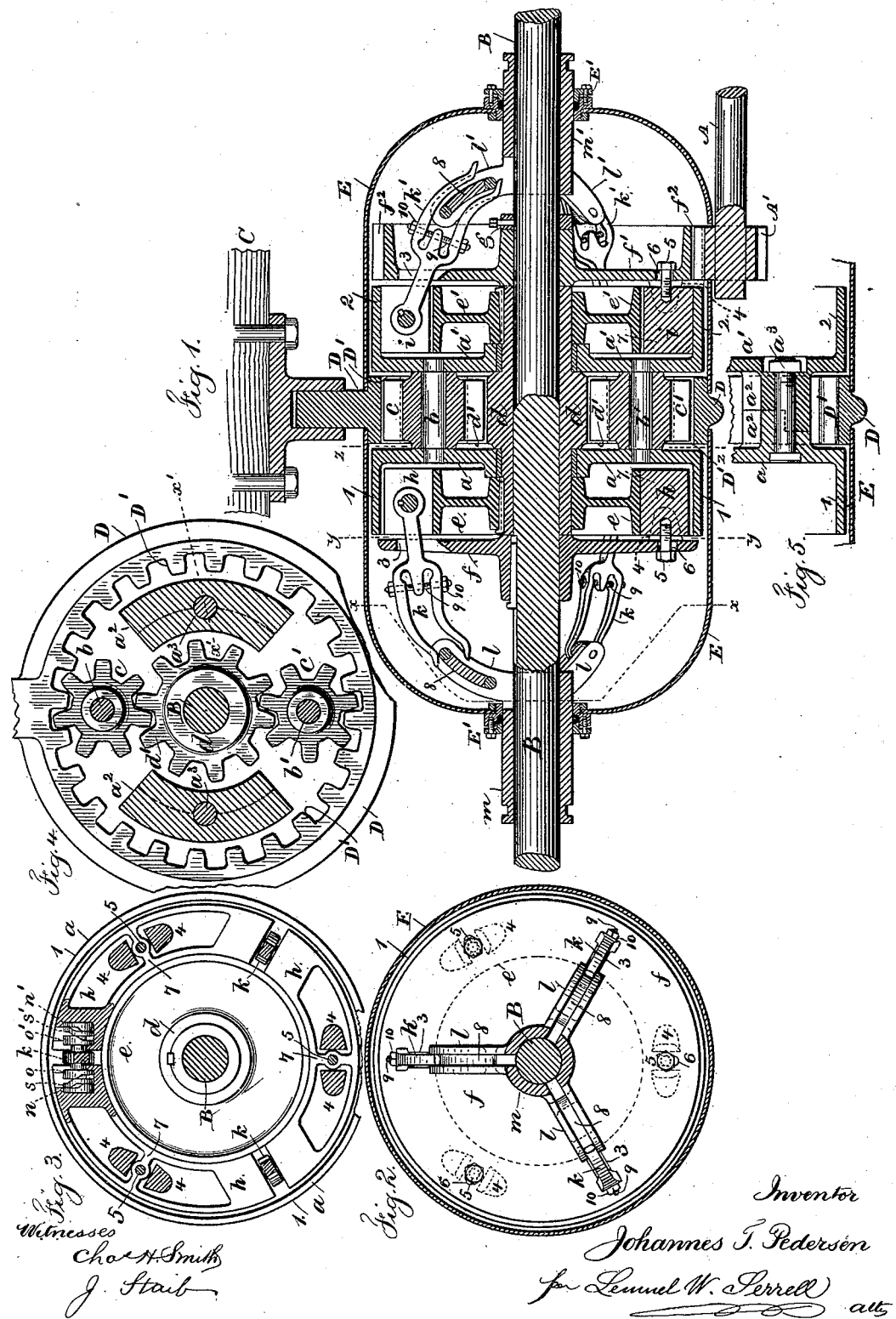

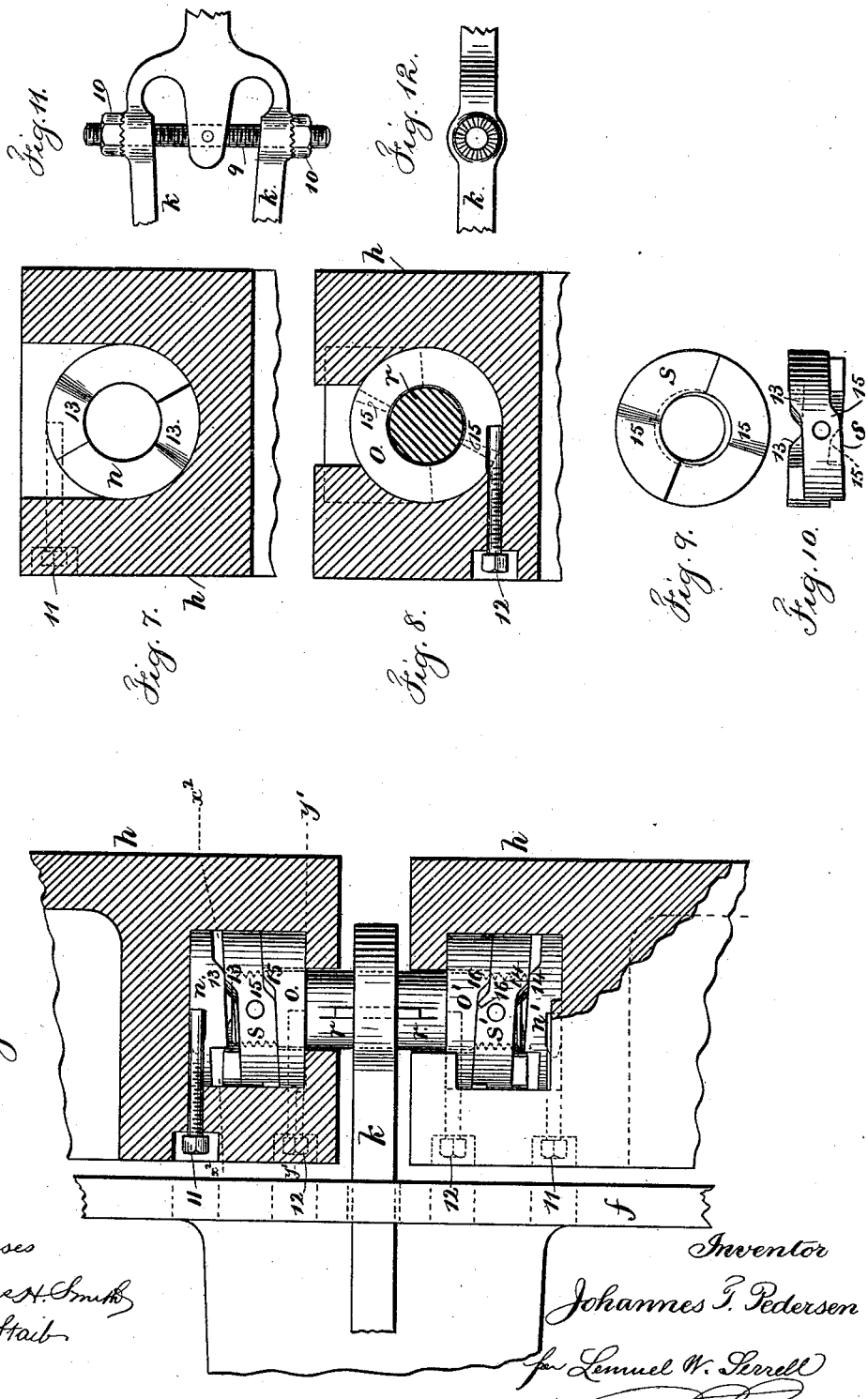

JOHANNES TH. PEDERSÊN, OF NEW YORK, N. Y.

DEVICE FOR TRANSMITTING MOTION.

SPECIFICATION forming part of Letters Patent No. 443,259, dated December 23, 1890.

Application filed July 5, 1890. Serial No. 357,737. (No model.)

*To all whom it may concern:*

Be it known that I, JOHANNES THEODOR PEDERSÊN, a citizen of the United States, residing in the city, county, and State of New York, have invented a new and useful Improvement in Devices for Transmitting Motion, of which the following is a specification.

Devices for transmitting motion from a power-shaft to a driven shaft have heretofore been employed and have been known as "speed-gears." In these devices the speed-gears have been located between the power or motor shaft and the driven shaft, and the said mechanism was changeable, so that the driven shaft could be rotated at the same speed as the driving or motor shaft or at a slower speed or at an accelerated speed. Speed-gears of this general character may be seen in Letters Patent granted to me January 27, 1885, No. 311,255.

My invention relates to a device for transmitting motion from a power or motor shaft to a driven shaft, and the mechanism may be so connected that both shafts will rotate at the same speed or the driven shaft may be revolved at a reduced or an accelerated speed. This mechanism is especially available in reducing the speed of an electric motor, so that it may be availed of to advantage in propelling railway-cars or machinery.

In the drawings, Figure 1 is a longitudinal section of my improved mechanism. Fig. 2 is a cross-section on the line $x\ x$ of Fig. 1. Fig. 3 is a cross-section on the line $y\ y$. Fig. 4 is a cross-section on the line $z\ z$. Fig. 5 is a sectional plan at the line $x'\ x'$ of Fig. 4. Fig. 6 is a sectional plan; Fig. 7, a cross-section at $x^2\ x^2$; Fig. 8, a cross-section at $y'\ y'$; Fig. 9, a side view, and Fig. 10 an edge view, of the cam-disks and adjacent operating mechanism. Fig. 11 is an elevation, and Fig. 12 a plan view, of details of the operating-arms, Figs. 6 to 12, inclusive, being of larger size.

A represents the motor or driving shaft, and A' its pinion.

B represents the driven shaft, and C a stationary body, which may be the body of a car, a beam, or other support.

D represents a ring having a pin projecting within a socket secured to the stationary body C, and said ring is thus held in place, and said ring has an integral gear D', and there is a case E connected to the ring D and provided with packing-rings E', and the driven shaft B passes centrally through this case.

I provide flanged disks $a\ a'$, having abutting portions $a^2$ and bolts $a^3$, by which they are connected together at opposite points, and intermediate to these parts I provide shafts $b\ b'$, having bearings in said disks, and pinions $c\ c'$, the teeth of which mesh with those of the stationary integral gear D'. There is a sleeve $d$ loose upon the driven shaft B and provided with a central pinion $d'$, whose teeth mesh with those of the pinions $c\ c'$. The sleeve $d$ is within the central openings of the disks $a\ a'$. There are pulleys $e\ e'$ surrounding the ends of the sleeve $d$ and keyed thereto outside the disks $a\ a'$, and these pulleys come within the flanges 1 2 of said disks, and between said pulleys and flanges there are annular spaces.

I provide disks $f\ f'$, having slotted openings 3 and 6 and lugs in pairs at 4. The disk $f$ is keyed to the driven shaft B; but the disk $f'$ is loose on said shaft and is held in place by a collar $g$ and bolt. The disk $f'$ has a flanged toothed periphery $f^2$, which is in gear with the pinion A' on the motor or driving shaft A. The three-part segmental grips $h\ i$ are located within the annular spaces between the pulleys $e\ e'$ and the flanges 1 2, and said grips are hollow and provided with central webs 7, carrying screw-bolts 5, which pass through the slots 6 in the disks $f\ f'$. The webs 7 also pass between the lugs 4 of said disks $f\ f'$, and by these parts said grips are connected to and supported by said disks and the parts are caused to move in unison. The respective grips $h\ i$ are each in three parts, connected together as a ring, and the parts of each grip are caused to approach or recede from each other by three sets of cam-disks, which are operated by forked arms or levers $k\ k'$, with bent points placed equidistant, as shown in Fig. 2. I provide equidistant arms $l\ l'$ upon sliding sleeves $m\ m'$ and surrounding the driven shaft B and within the packings E', and these arms $l\ l'$ have central narrow webs 8, against which and between the parts of which arms the forked ends of the arms $k\ k'$ are received and operated. These forked arms $k\ k'$ are expanded or contracted by bolts 9 and nuts 10. These bolts 9 are secured in the central projections of said arms and pass loosely through the forked portions, and the nuts have radial ribs on their under surface adapted to engage radial depressions in the outer faces of said arms, whereby the said nuts are kept from working loose, as shown in the separate Figs. 11 and 12.

Each set of cam-disks is composed of the following parts, which are received into openings or pockets in the respective ends of the segmental grips. There are outer cam-disks $n\ n'$ and inner cam-disks $o\ o'$, which are loose, but kept from rotating by screw-bolts 11 12, which pass through the grips parallel with the shaft B, and their ends enter recesses in the disks $n\ n'$ and $o\ o'$ to prevent them turning. I provide a central shaft $r$, to which one arm $k$ or $k'$ is keyed, and this arm is between the adjacent ends of the grip-blocks, and the shaft $r$ passes through the slotted ends of the grips, through the inner disks $o\ o'$, and through the central cam-disks $s\ s$, which disks are permanently attached to said shaft $r$, preferably by being screwed and pinned, in order that the parts may be rigidly connected, so as to be turned together by the arm $k$ or $k'$. These disks $n\ n'$, $o\ o'$, and $s\ s'$ have quick cam-faces similar to screw-sections with short and steep inclines.

In the position shown in Fig. 6 the forked lever is depressed, and the cam-faces of $n\ s$ and $n'\ s'$ and the inclines 13 and 14 have acted together to press outwardly the segmental grips into the position, Fig. 1, to cause said grips $i$ to engage the flange 2 of the disk $a'$. When the forked lever is moved in the opposite direction to turn the shaft $r$ and disks $s\ s'$, the faces of cam-disks $n\ s$ and $n'\ s'$ close together, so that there is no space between them, and simultaneously the cam-faces of $o\ s$ and $o'\ s'$ and the inclines 15 and 16 act against each other to separate these disks and so force the grips toward each other to the position shown in Fig. 1, so that the grips $h$ close around and engage the pulleys $e$ or $e'$.

The operation of my device in the position of the parts, Fig. 1, is as follows: The motor-shaft A and pinion A' revolve, and in turn revolve the toothed disk $f'$, which by bolts 5 and lugs 4 revolve the loose flanged disks $a\ a'$ by the segmental grips $i$ engaging the flange 2. The disks $a\ a'$ revolve together, and their pinions $c\ c'$ being acted on by the stationary internal gear D' cause the pinion $d'$ and sleeve $d$ to revolve in the same direction as the toothed disk $f'$, but at a greatly-accelerated speed, which is governed by the relative sizes and numbers of teeth upon the various gears. The revolving sleeve $d$ causes the pulley $e$ keyed to it to revolve at a like speed, and because the segmental grips $h$ are at this side held to the surface of the pulley $e$ they also revolve at like speed, and by the lugs 4 and bolts 5 cause the disk $f$ and driven shaft B also to revolve at the accelerated speed. If now the sleeve $m$ is moved toward the disk $f$, the arms $k$ will be forced toward the shaft B and the cam-disks will operate the segmental grips $h$ to release them from the pulley $e$ and cause them to recede from each other and engage the flange 1 of the loose disk $a$. In this position motion will be communicated from the shaft A, pinion A', disk $f'$, and grips $i$ to disks $a'$ and to disk $a$, as the same are coupled and moved together, and from the disk $a$ through the grips $h$ to disk $f$ and shaft B, which is thus driven at the same speed as that imparted to the toothed disk $f'$, the gears $c\ c'\ d'$ and sleeve $d$, with the pulleys $e\ e'$, running freely or loosely. If with the parts in this latter position the sleeve $m'$ is moved outwardly and the arms $k'$ thrown outwardly, the cam-disks will be operated upon to contract the segmental grips $i$ or cause them to approach each other and be clamped against the surface of the pulley $e'$ after releasing the flange 2. In this latter position the motion and power communicated from the shaft A and pinion A' to the toothed disks $f'$ will be transmitted through the segmental grips $i$ to the pulley $e'$ and sleeve $d$ and its pinion $d'$. The pinion $d'$ will act upon the pinions $c\ c'$, and these will roll against the stationary integral gear D' and impart by their shafts to the disks $a\ a'$ a rotation much slower than that of the sleeve $d$. The disk $a$, segmental grips $h$, and disk $f$ being connected will give to the driven shaft B, to which the disk $f$ is keyed, the reduced rate of speed, and the power imparted to the shaft B will be proportionately augmented. It will thus be seen that according to the location of the segmental grips $h\ i$ and their respective engagement with the disks $a\ a'$ or pulleys $e\ e'$ the speed is increased, diminished, or rendered uniform. If the segmental grips $h\ i$ are both in contact with the pulleys $e\ e'$, the same thing will be accomplished as if they were engaged with the flanges 1 2.

The device shown in Fig. 1 is especially adapted for use in an electrically-propelled street-car, the shaft A being that of the electric motor, and the shaft B the axle upon which the wheels are mounted, and the portion C the body of the car to which my improved device is connected.

The case E and packings E' serve to prevent dust and foreign substances getting into the mechanism and to hold a body of oil if it should be desirable to run the mechanism in oil, in which case the shaft A and pinion A' will be placed level with the shaft B.

I claim as my invention—

1. The combination, with the motor or driving shaft and the driven shaft, of an internally-toothed ring, a sleeve and gear around the driven shaft, intermediate gear-wheels and flanged disks carrying the same, pulleys connected to the aforesaid sleeve, a disk keyed to the driven shaft, a loose disk operated by the motor-shaft, gripping devices for engaging the pulleys or flanged disks, and devices for contracting or expanding the gripping devices, substantially as set forth.

2. The combination, with the motor or driving shaft and the driven shaft and an internally-toothed ring, of a sleeve and integral pinion loose on the driven shaft, pulleys keyed to the respective ends of the sleeve, flanged disks connected together between said pulleys loose on said sleeve and intermediate gears carried thereby, a disk keyed to the driven shaft, a loose disk with a toothed flange operated by the driving or motor shaft, gripping devices for engaging the pulleys or flanged disks, sliding sleeves having arms and movable upon the driven shaft, and mechanism, substantially as set forth, operated by the sleeves and arms and adapted to contract or expand the gripping devices, substantially as set forth.

3. The combination, with the motor-shaft, the driven shaft, the gears, and mechanism for changing speed, of the fast and loose disks $f\ f'$, having openings at 3 and 6 and lugs 4 in pairs, the segmental grips $h\ i$, having webs 7, the connecting-bolts 5, the sleeves $m\ m'$, and mechanism, substantially as specified, connecting the grips and sleeves for operating the parts and varying the speed, substantially as set forth.

4. The combination, with the motor-shaft and driven shaft in a device for transmitting motion, of the pulleys $e\ e'$, disks $f\ f'$, sleeves $m\ m'$, arms $l\ l'$, the segmental grips $h\ i$, cam-disks and shafts connecting the segmental grips, arms $k\ k'$ upon said shafts operated by the shifting of the sleeves $m\ m'$, and arms $l\ l'$, substantially as and for the purposes set forth.

5. The combination, with the segmental grips $h$ or $i$, having cavities in their opposing ends, of the loose outer cam-disks $n\ n'$, the loose inner cam-disks $o\ o'$, the bolts 11 12 for preventing their rotation, the central shafts $r$, the cam-disks $s$ between the loose outer and inner disks and connected to the shafts $r$, and the arms $k$ or $k'$ for imparting a partial rotation to the shafts $r$ and disks $s$, whereby the segmental grips are drawn together or spread apart, substantially as set forth.

6. The combination, with the segmental grips $h\ i$ and the sleeves $m\ m'$ and arms $l\ l'$, of the shafts and cam-disks connecting the segmental grips, the forked arms $k\ k'$, having bent ends and central projections, the screws 9, secured to the central projections, the nuts 10 for adjusting the arms $k\ k'$, and radial projections on the under sides of said nuts, adapted to engage radial depressions in the faces of the arms, substantially as and for the purposes set forth.

7. The combination, with the segmental grips $h$ or $i$ and the forked arms $k$ or $k'$, of the shafts $r$, to which said arms are keyed, the outer cam-disks $n\ n'$, the inner cam-disks $o\ o'$, the bolts 11 12, the central disks $s$, secured to the shafts $r$, said disks having opposing quick cam-faces, and short sharp inclines 13, 14, 15, and 16, by which the said grips are operated, substantially as set forth.

Signed by me this 16th day of June, A. D. 1890.

JOHANNES TH. PEDERSÊN.

Witnesses:
   GEO. T. PINCKNEY,
   HAROLD SERRELL.